Oct. 23, 1928.

W. M. TURNLEY

DRY BATTERY

Filed Jan. 4, 1926

1,688,565

Inventor.
William Micou Turnley
by H. J. S. Dennison, atty.

Patented Oct. 23, 1928.

1,688,565

UNITED STATES PATENT OFFICE.

WILLIAM MICOU TURNLEY, OF TORONTO, ONTARIO, CANADA.

DRY BATTERY.

Application filed January 4, 1926. Serial No. 79,146

The principal objects of the invention are to maintain each dry cell unit from being short circuited by accidental bridging of the positive and negative elements by effectively protecting the upper edge of the zinc container and to effectively reduce the cost of construction.

The principal feature of the invention consists in providing an insulating cover for the cell which extends over the end of the zinc container and fits snugly into a cylindrical insulating enclosure.

A further and important feature consists in securing the insulating cover of the cell in place with an adhesive insulating material closing the end of the container.

Figure 1:
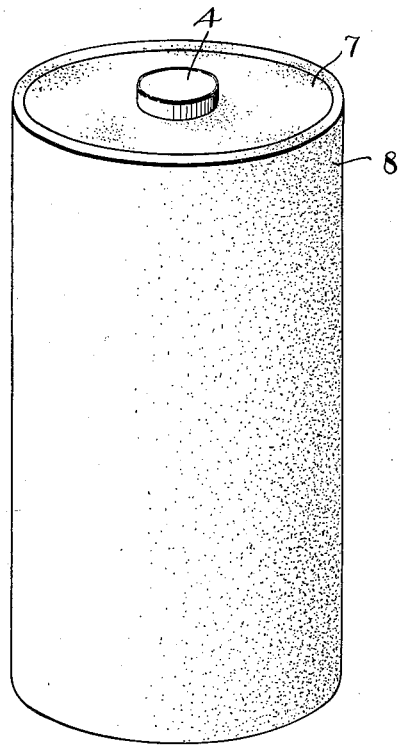

In the drawings, Figure 1 is a perspective view of a dry cell unit, showing the new type of top insulating member.

Figure 2:
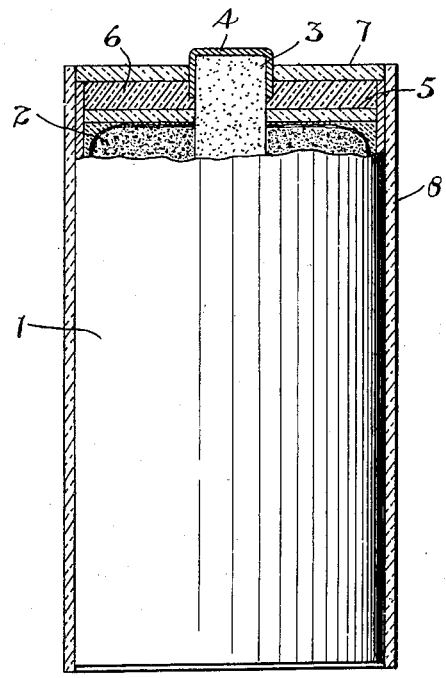

Figure 2 is a vertical part sectional view of the improved unit.

It has been customary in the manufacture of dry cells to place the active material within a zinc container surrounding the positive carbon element and a filling of a sealing wax has been poured into the container to seal the contents. An outer casing of cardboard or paper has then been placed around the zinc container.

It has been found in practice that short circuiting of a cell frequently occurs through the exposure of the upper edge of the container and the present invention has been devised to overcome this condition by providing a cover for the top of the cell to extend over the upper edge of the cell. This cover preferably fits snugly into the side wall enclosure of the cell and the zinc container is thus completely enclosed.

In the structure herein illustrated, the zinc container 1 is of the cylindrical type open at the top and in it is placed the ordinary active material 2 surrounding the positive carbon element 3 which is provided with a metal cap 4. A cardboard or paper disc 5 is slipped over the carbon element and fits snugly within the interior of the container 1.

An insulating seal 6 of tar or other adhesive bituminous material is poured into the container on top of the disc 5 and forms a seal with the side wall of the container and while this material is still hot, a disc 7 of the cardboard or any suitable insulating material of the same diameter as the external diameter of the container 1 or very slightly larger, is placed over the upper end of the container, a central perforation being provided to receive the metal cap 4 of the positive element. This disc is placed in position while the bituminous seal 6 is still hot and the latter adheres effectively to the underside of the disc and permanently secures it in place.

This disc completely covers the upper edge of the container 1 and when the outer insulating shell 8, which is usually a cylindrical cardboard member, is placed in position the circumferential edge of the disc bears against the inner wall of this insulated shell and completely closes the same.

A very effective insulation is thus accomplished and a very cheap class of sealing material for the top of the cell may be used which has distinct advantages over the hard form of sealing wax which has previously been in common use because the present form of a soft, bituminous material such as tar will expand and contract in varying temperatures without cracking and it will also maintain its adhesion to the inner wall of the container and also to the exterior of the carbon element and its metal cap. The adhesive quality also holds the perforated top cap permanently in position, covering the upper end of the cell.

A sealing material of the quality used under the present circumstances is very much cheaper than that previously used, which was in the form of a hard sealing wax and the use of the bituminous material very materially reduces the cost.

What I claim as my invention is:—

1. In a dry cell, the combination with the metallic container of an adhesive sealing material closing the top of the container, and a preformed disc of fibrous insulating material placed over and secured by said adhesive sealing material and extending over the edge of the container.

2. In a dry cell, the combination with a metallic container, of a free disc stamped from sheet of insulating material of a diameter substantially the same as the container adapted to fit over the top thereof and be secured thereto, and an outer insulating enclosure for said cell extending above the top edge thereof and engaging the peripheral edge of said disc.

3. In a dry cell, the combination with a cylindrical metallic container containing the active material and a centrally arranged positive element extending above the top edge of the container, of a preformed cardboard disc of a diameter substantially equal to the external diameter of the cell container and having a central opening, the periphery of which snugly engages the extending positive element, and a cylindrical cardboard cover encircling the container and extending thereabove and fitting snugly to the periphery of the perforated cardboard disc.

4. In a dry cell, the combination with a metallic container, of an insulating cover for said container covering the end edges thereof, and a sealing filling of adhesive plastic material closing the top of the container and adhering to the under side of said cover and retaining the same in place.

WILLIAM MICOU TURNLEY.